United States Patent
Zope et al.

(10) Patent No.: US 12,026,047 B2
(45) Date of Patent: Jul. 2, 2024

(54) METHOD AND SYSTEM FOR ROOT CAUSE IDENTIFICATION OF FAULTS IN MANUFACTURING AND PROCESS INDUSTRIES

(71) Applicant: Tata Consultancy Services Limited, Mumbai (IN)

(72) Inventors: Kalyani Bharat Zope, Pune (IN); Tanmaya Singhal, Pune (IN); Sri Harsha Nistala, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 105 days.

(21) Appl. No.: 17/815,605

(22) Filed: Jul. 28, 2022

(65) Prior Publication Data
US 2023/0267028 A1    Aug. 24, 2023

(30) Foreign Application Priority Data

Feb. 18, 2022 (IN) .............................. 202221008695

(51) Int. Cl.
G06F 11/00 (2006.01)
G06F 11/07 (2006.01)

(52) U.S. Cl.
CPC ........ G06F 11/079 (2013.01); G06F 11/0736 (2013.01)

(58) Field of Classification Search
None
See application file for complete search history.

(56) References Cited

U.S. PATENT DOCUMENTS 11,009,862 B2 *  5/2021  Oostendorp ..... G06Q 10/06395
11,354,184 B2 *  6/2022  Jung ................... G06F 18/2323
(Continued)

FOREIGN PATENT DOCUMENTS

| CN | 109359662 A | 8/2021 |
| CN | 113656906 A | 11/2021 |
| CN | 113110402 A | 4/2022 |

OTHER PUBLICATIONS

Google Scholar/Patents search—text refined (Year: 2023).*
(Continued)

Primary Examiner — Christopher S McCarthy
(74) Attorney, Agent, or Firm — FINNEGAN, HENDERSON, FARABOW, GARRETT & DUNNER, LLP

(57) ABSTRACT

The disclosure is a method and a system for root cause identification (RCI) of faults in manufacturing and process industries. With complex interrelated multivariate data in manufacturing and process industries, the process of root RCI of faults is challenging. Further, the existing techniques for RCI have significant dependency on manual inputs and subject matter knowledge/experts. The disclosure is method and a system for root cause identification of a fault based on causal maps. The root cause of fault is identified in several steps including: generation of casual maps using data received from a manufacturing and process industry and root cause identification from the causal maps based on a Fault Traversal and Root Cause Identification (FTRCI) technique. The FTRCI identifies root cause from the causal map by identifying a fault traversal pathway from a leaf node in the causal map, wherein the fault traversal pathway is identified for even cyclic paths.

14 Claims, 7 Drawing Sheets

(56) References Cited

U.S. PATENT DOCUMENTS

| | | | |
|---|---|---|---|
| 2019/0227860 A1* | 7/2019 | Gefen | G06F 16/9024 |
| 2019/0318288 A1* | 10/2019 | Noskov | G05B 23/0281 |
| 2022/0035694 A1* | 2/2022 | Yu | G06F 11/327 |
| 2023/0376026 A1* | 11/2023 | Zhang | G05B 23/027 |

OTHER PUBLICATIONS

Google Scholar/Patents search—text refined (Year: 2024).*
Natali van Zijl et al., "A Hierarchical Approach to Improve the Interpretability of Causality Maps for Plant-Wide Fault Identification," Minerals, Jul. 2021, vol. 11 (8), MDPI, https://www.mdpi.com/2075-163X/11/8/823.
Hao Ye, Ethan R. et al., "Distinguishing time-delayed causal interactions using convergent cross mapping," Scientific Report, Oct. 2015, Nature, https://www.nature.com/articles/srep14750.pdf.

* cited by examiner

identifying a root cause variable in the fault traversal pathway, wherein the root cause variable indicates the root cause, the identification of the root cause variable comprises:
(a) for the fault traversal pathway obtained on reaching a root node: the root node is identified as the root cause variable, or
(b) for the fault traversal pathway obtained on detecting a causal loop: the root cause variable is identified based on the lag value of the plurality of discretized-transformed fault variables in the causal loop of the causal map

FIG. 4B

METHOD AND SYSTEM FOR ROOT CAUSE IDENTIFICATION OF FAULTS IN MANUFACTURING AND PROCESS INDUSTRIES

PRIORITY CLAIM

This U.S. patent application claims priority under 35 U.S.C. § 119 to: India Application No. 202221008695, filed on 18 Feb. 2022. The entire contents of the aforementioned application are incorporated herein by reference.

TECHNICAL FIELD

The disclosure herein generally relates to analysis of faults in manufacturing and process industries, and, more particularly, a method and a system for root cause identification of faults in manufacturing and process industries.

BACKGROUND

With advancement in process as well as sensing technologies, the complexity of data generated from manufacturing and process industries has also increased leading to analysis of complex multivariate data for predictive and prescriptive maintenance of processes and equipment that entail detecting faults and abnormal events early and recovering from them with minimal impact of key performance parameters. An important feature in predictive maintenance is fault diagnosis, wherein fault diagnosis comprises identification of key variables/sensors bearing the fault signature (fault localization/isolation), classification of the detected fault into one or more known fault classes (fault classification) and identification of the root cause/source of the fault (root cause identification).

Root cause identification (RCI) of faults enables operators and plant engineers to pinpoint the source(s)/causes of the fault and take appropriate corrective actions to prevent catastrophic failure. However, RCI in industrial systems is challenging in manufacturing and process industries due to complex behavior of the processes, interactions among sensors, corrective actions of control systems and wide variability in fault behavior. Further, due to the complex interdependent multivariate data, it is challenging to manually identify the intricate causal structures to detect the root cause of faults.

The existing state-of-the-art techniques for automatic root cause identification include knowledge-based techniques and data-driven techniques. Knowledge-based techniques require a prior knowledge of faults/failures along with exhaustive details on the relationships between faults and observations (symptoms) while the data-driven methods rely entirely on historical and current operating data. Hence, the existing techniques have significant dependency on manual inputs and subject matter knowledge/experts. However, with the growing complexity of multivariate data from manufacturing and process industries, there is a growing requirement to lower the dependency on manual inputs and subject matter knowledge/experts and automate root cause identification.

SUMMARY

Embodiments of the present disclosure present technological improvements as solutions to one or more of the above-mentioned technical problems recognized by the inventors in conventional systems. For example, in one embodiment, a method for root cause identification of fault in manufacturing and process industries is provided. The system includes a memory storing instructions, one or more communication interfaces, and one or more hardware processors coupled to the memory via the one or more communication interfaces, wherein the one or more hardware processors are configured by the instructions to receive a plurality of time-series data from a plurality of sources, via one or more hardware processors, wherein the plurality of time-series data comprises a plurality of real-time data and a plurality of non-real-time data. The system is further configured for pre-processing the plurality of time-series data to obtain a plurality of pre-processed data, via the one or more hardware processors, wherein the plurality of time-series data is pre-processed using a set of plurality of pre-processing techniques. The system is further configured for predicting a plurality of soft sensed parameters using the plurality of pre-processed data, via the one or more hardware processors, wherein the plurality of soft sensed parameters are predicted based a soft sensed parameters prediction technique. The system is further configured for detecting at a fault, a plurality of fault variables indicative of the fault and a fault contribution score for each of the plurality of fault variables, via the one or more hardware processors, from the plurality of pre-processed data and the plurality of soft sensed parameters using a fault detection-localization technique. The system is further configured for discretizing and transforming the plurality of fault variables to obtain a plurality of discretized-transformed fault variables, via the one or more hardware processors, based on a discretization-transformation technique. The system is further configured for generating a causal map of the plurality of discretized-transformed fault variables using a dynamic causal network generation technique, via the one or more hardware processors, where the causal map defines a cause-effect relationship among the plurality of discretized-transformed fault variables, and a causal contribution score and a lag value is computed for each of the plurality of discretized-transformed fault variables in the causal map. The system is further configured for identifying at least one root cause for the fault based on a Fault Traversal and Root Cause Identification (FTRCI) technique, via the one or more hardware processors, wherein the root causes are identified using the causal map, the causal contribution scores, the lag values, and the fault contribution scores based on the FTRCI technique.

In another aspect, a method for root cause identification of fault in manufacturing and process industries is provided. The method includes receiving a plurality of time-series data from a plurality of sources, via one or more hardware processors, wherein the plurality of time-series data comprises a plurality of real-time data and a plurality of non-real-time data. The method further includes pre-processing the plurality of time-series data to obtain a plurality of pre-processed data, wherein the plurality of time-series data is pre-processed using a set of plurality of pre-processing techniques. The method further includes predicting a plurality of soft sensed parameters using the plurality of pre-processed data, wherein the plurality of soft sensed parameters are predicted based a soft sensed parameters prediction technique. The method further includes detecting at a fault, a plurality of fault variables indicative of the fault and a fault contribution score for each of the plurality of fault variables, from the plurality of pre-processed data and the plurality of soft sensed parameters using a fault detection-localization technique. The method further includes discretizing and transforming the plurality of fault variables to obtain a plurality of discretized-transformed fault variables, based on a discretization-transformation technique. The method further includes generating a causal map of the plurality of discretized-transformed fault variables using a dynamic causal network generation technique, where the causal map defines a cause-effect relationship among the plurality of discretized-transformed fault variables, and a causal contribution score and a lag value is computed for each of the plurality of discretized-transformed fault variables in the causal map. The method further includes identifying at least one root cause for the fault based on a Fault Traversal and Root Cause Identification (FTRCI) technique, wherein the root causes are identified using the causal map, the causal contribution scores, the lag values, and the fault contribution scores based on the FTRCI technique.

In yet another aspect, a non-transitory computer readable medium for root cause identification of fault in manufacturing and process industries is provided. The program includes receiving a plurality of time-series data from a plurality of sources, via one or more hardware processors, wherein the plurality of time-series data comprises a plurality of real-time data and a plurality of non-real-time data. The program further includes pre-processing the plurality of time-series data to obtain a plurality of pre-processed data, wherein the plurality of time-series data is pre-processed using a set of plurality of pre-processing techniques. The program further includes predicting a plurality of soft sensed parameters using the plurality of pre-processed data, wherein the plurality of soft sensed parameters are predicted based a soft sensed parameters prediction technique. The program further includes detecting at a fault, a plurality of fault variables indicative of the fault and a fault contribution score for each of the plurality of fault variables, from the plurality of pre-processed data and the plurality of soft sensed parameters using a fault detection-localization technique. The program further includes discretizing and transforming the plurality of fault variables to obtain a plurality of discretized-transformed fault variables, based on a discretization-transformation technique. The program further includes generating a causal map of the plurality of discretized-transformed fault variables using a dynamic causal network generation technique, where the causal map defines a cause-effect relationship among the plurality of discretized-transformed fault variables, and a causal contribution score and a lag value is computed for each of the plurality of discretized-transformed fault variables in the causal map. The program further includes identifying at least one root cause for the fault based on a Fault Traversal and Root Cause Identification (FTRCI) technique, wherein the root causes are identified using the causal map, the causal contribution scores, the lag values, and the fault contribution scores based on the FTRCI technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4A and FIG. 4B show a flow diagram illustrating a method (400) for identifying a root cause for the fault based on a Fault Traversal and Root Cause Identification (FTRCI) technique, by the system of FIG. 1, in accordance with some embodiments of the present disclosure.

DETAILED DESCRIPTION

Figure 1:
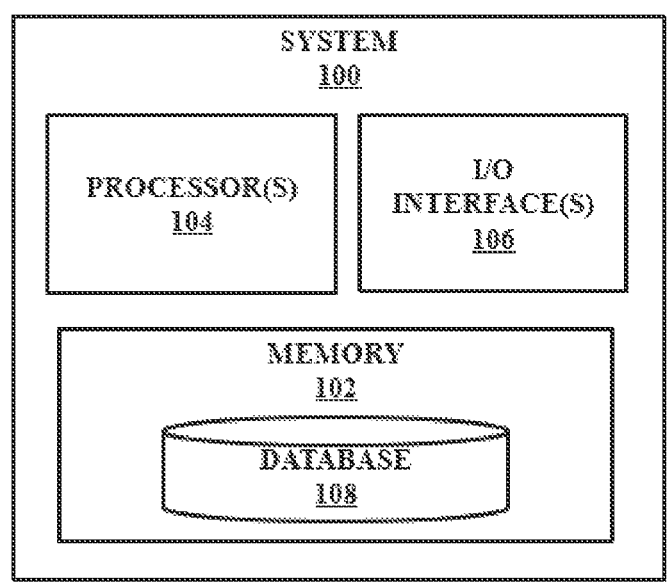

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a functional block diagram of a system 100 for root cause identification of fault in manufacturing and process industries in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding data associated with manufacturing and process industries. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
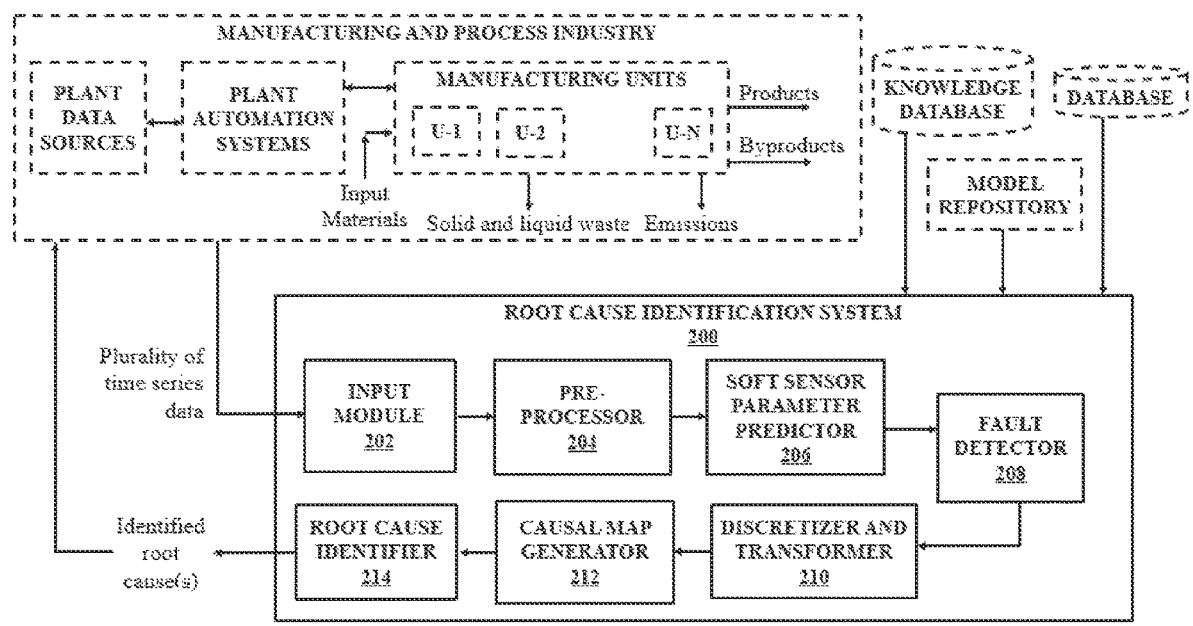
FIG. 2 is a functional block diagram of the system of FIG. 1, according to some embodiments of the present disclosure.
Figure 3A:
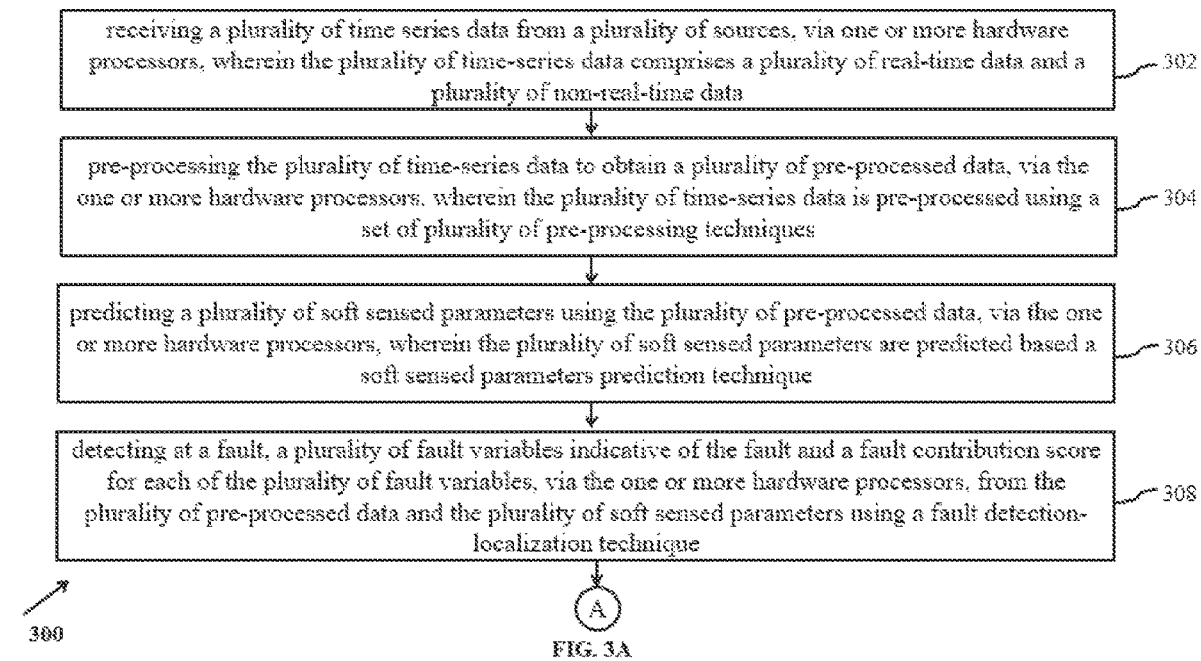
FIG. 3A and FIG. 3B show a flow diagram illustrating a method (300) for root cause identification of fault in manufacturing and process industries, by the system of FIG. 1, in accordance with some embodiments of the present disclosure.
Figure 3B:
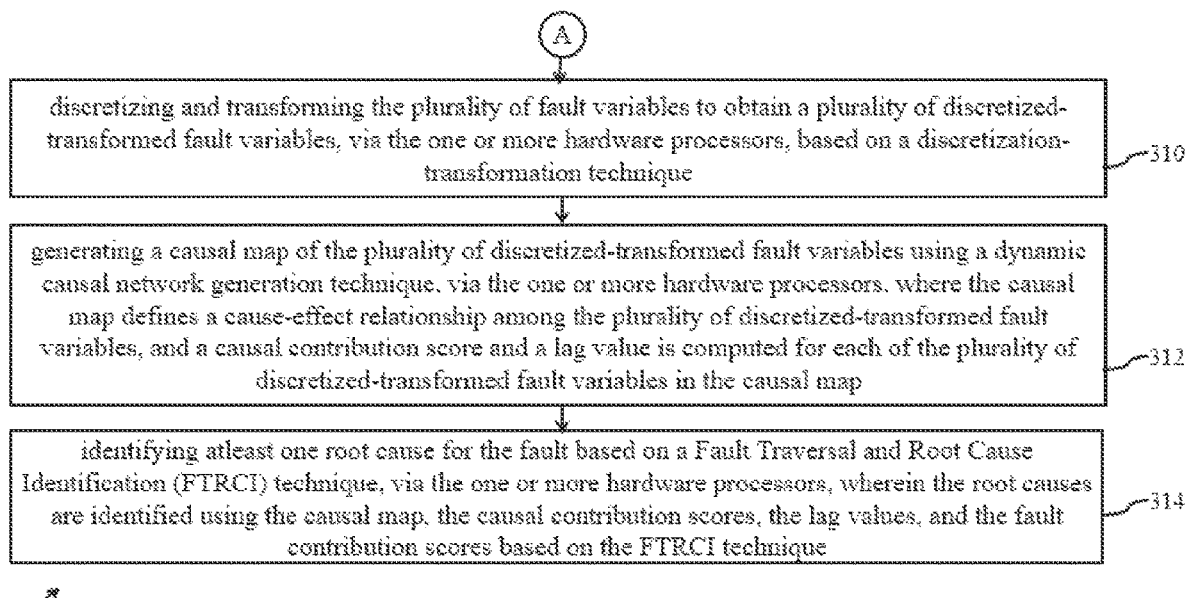

Functions of the components of system 100 are explained in conjunction with functional overview of the system 100 in FIG. 2 and flow diagram of FIGS. 3A-3B, for root cause identification of faults in manufacturing and process industries.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2A illustrates the functions of the modules of the system 100 that includes root cause identification of faults in manufacturing and process industries.

In an embodiment, the system 200 is a root cause identification (RCI) system that is connected to a manufacturing and process industry. The manufacturing and process industry includes one or more-unit operations or the entire plant from iron & steel, power generation, oil & gas upstream, crude oil refineries, pharmaceuticals, cement, pulp & paper, consumer packaged goods, semiconductor manufacturing, polymer and fine chemical industries.

The manufacturing and process industry comprises at least one industrial plant data source, plant automation system or distributed control system (DCS), a server, a plurality of manufacturing units that have inputs in the form of one or more raw materials and outputs in the form of products, byproducts, solid-liquid wastes and gaseous emissions. The manufacturing and process industry also includes several databases/repositories. It should be appreciated that the model repository the knowledge database and the plurality of databases could be the part of the data repository. In an embodiment, the multivariate time series data from all the plant data sources and automation systems is brought to the RCI System via a Server.

The root cause identification (RCI) system 200, comprises an input module 202 configured for receiving a plurality of time series data from a plurality of sources. The system 200 further comprises a pre-processor 204 configured for pre-processing the plurality of time-series data using a set of plurality of pre-processing techniques to obtain a plurality of pre-processed data. The system 200 further comprises a soft sensor parameter predictor 206 configured for predicting a plurality of soft sensed parameters using the plurality of pre-processed data. The system 200 further comprises a fault detector 208 configured for detecting at a fault, a plurality of fault variables indicative of the fault and a fault contribution score from the plurality of pre-processed data and the plurality of soft sensed parameters using a fault detection-localization technique. The system 200 further comprises a discretizer and transformer 210 configured for discretizing and transforming the plurality of fault variables to obtain a plurality of discretized-transformed fault variables. The system 200 further comprises a causal map generator 212 configured for generating a causal map of the plurality of discretized-transformed fault variables using a dynamic causal network generation technique. The system 200 further comprises a root cause identifier 214 configured for identifying at least one root cause for the fault based on a Fault Traversal and Root Cause Identification (FTRCI) technique.

The various modules of the system 100 and the functional blocks in FIG. 2 are configured for root cause identification of faults in manufacturing and process industries are implemented as at least one of a logically self-contained part of a software program, a self-contained hardware component, and/or a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIG. 3A and FIG. 3B. The FIG. 3A and FIG. 3B with reference to FIG. 1, is an exemplary flow diagram illustrating a method 300 for root cause identification of faults in manufacturing and process industries using the system 100 of FIG. 1 according to an embodiment of the present disclosure.

The steps of the method of the present disclosure will now be explained with reference to the components of the system (100) root cause identification of faults in manufacturing and process industries, the modules (202-214) as depicted in FIG. 2 and the flow diagrams as depicted in FIG. 3A and FIG. 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of time series data is received from a plurality of sources via the input module 202. The plurality of time series data comprises a plurality of real-time data and a plurality of non-real-time data.

In an embodiment, the plurality of sources associated with the manufacturing and process industries is associated with manufacturing and process industries that includes iron & steel, power generation, oil & gas, crude oil refineries, pharmaceuticals, cement, pulp & paper, consumer packaged goods, semiconductor manufacturing, polymer and fine chemicals. The manufacturing and process industries comprises of several database including sensor database, a laboratory database, an environment database and a maintenance database.

In an embodiment, the real-time data includes an operations data and an environment data. The operations data is recorded using a plurality of sensors in the plant and the plurality of sensors includes sensors for measuring temperatures, pressures, mass and volumetric flow rates, levels, concentrations and vibrations from processes and equipment in the units of the plant. The operations data is obtained via a distributed control system (DCS), OPC server, etc. and is stored in an operations or sensor database or historian. The environment data such as ambient temperature, atmospheric pressure, ambient humidity, dust level, rainfall, etc. is also recorded by specific sensors meant for the environment data and is stored in the environment database of the manufacturing and process industries.

The non-real-time data includes data from laboratories and maintenance activities. The laboratory data comprises of characteristics (such as chemical composition, size distribution, concentration, density, viscosity, calorific value, microstructural composition, mechanical strength, etc.) of raw materials, products, byproducts, solid and liquid waste and gaseous emissions that are tested at the laboratory. The laboratory data is typically stored and retrieved from a laboratory information management system (LIMS), relational database (RDB) or SQL database. Information related to the condition of the process and equipment, plant running status, maintenance activities performed on the plant units, etc. is stored and retrieved from the maintenance database of the manufacturing and process industries.

At step 304 of the method (300), the plurality of time series data is pre-processed in the pre-processor 204 to obtain a plurality of pre-processed data. The plurality of time series data is pre-processed using a set of plurality of pre-processing techniques.

In an embodiment, the plurality of pre-processing techniques comprises several techniques for:
(a) identification and removal of spurious values,
(b) imputation of missing values and unification of sampling frequency, and
(c) incorporation of appropriate lags, synchronization of data based on timestamps and combining data from plurality of data sources.

In an embodiment, the pre-processing techniques include techniques such as extreme value capping known in the art for identification and removal of spurious values and redundant data. The pre-processing techniques for imputation of missing values and unification of sampling frequency includes a Simple Moving Average, Exponential Weighted Moving Average, Last Value Carried Forward, ARIMA, Linear Interpolation and Multiple Imputation by Chained Equations (MICE). The pre-processing techniques also includes known techniques for the synchronization of data and combining data from plurality of data sources. The pre-processing techniques are not limited to the techniques shared above but includes any technique that can be used to meet the objective of (a) identification and removal of spurious values, (b) imputation of missing values and unification of sampling frequency and (c) synchronization of data and combining data from plurality of data sources.

In an embodiment, the pre-processing techniques are performed on both the real-time data and non-real-time data. The pre-processing techniques involves removal of redundant data, identification and removal of spurious values, unification of sampling frequency, imputation of missing data, synchronization of data by incorporating appropriate lags, and combining data from plurality of data sources. The technique for imputation includes simple moving average, exponential moving average, interpolation etc. The pre-processing techniques are not limited to the techniques shared above but includes any technique that can be used to meet the objective of (a) identification and removal of spurious values, (b) imputation of missing values and uniform sampling and (c) synchronization of data and combining data from plurality of data sources.

At step 306 of the method (300), a plurality of soft sensed parameters is predicted using the plurality of pre-processed data in the soft sensor parameter predictor 206. The plurality of soft sensed parameters is predicted based a soft sensed parameters prediction technique.

In an embodiment, the soft sensor parameters prediction technique comprises one of a physics-based models, a physics-based formulae and expressions and a data-driven models.

Soft sensor prediction models for each plant are built using physics-based models such as heat and mass balance, population balance, force balance, etc., and machine learning, deep learning or statistical techniques such as response surface methodology (RSM) and stored in the soft sensor database. For each plant, the corresponding soft sensor prediction models are activated from soft-sensor database and soft-sensor parameters are predicted. The soft sensors are used to estimate a plurality of soft sensed parameters, as the direct use of physical sensors may not be possible in some particular applications or environments due to constraints such as access requirements, extreme operating conditions, disturbances in environment or limitations of the sensors. Examples of soft sensors include temperature in the firing zone of a furnace, concentration of product or byproducts inside a reactor, etc.

At step 308 of the method (300), a fault, a plurality of fault variables indicative of the fault and a fault contribution score for each of the fault variables from the plurality of fault variables is detected in the fault detector 208. The fault, the plurality of fault variables indicative of the fault and the fault contribution score is detected from the plurality of pre-processed data and the plurality of soft sensed parameters using a fault detection-localization technique.

In an embodiment, the fault detection-localization technique comprises one of a statistical and machine learning techniques including a Principal component analysis (PCA), a Mahalanobis distance, a local outlier factor, an isolation forest, an elliptic envelope, a one-class support vector machine, a K-nearest neighbors, and a deep learning techniques that comprises a multilayer perceptron, an autoencoders (AEs) including a long short term memory autoencoder (LSTM-AE) a dense autoencoder (Dense-AE), and a convolution neural network autoencoder (CNN-AE).

The fault detection-localization technique is explained in this section, by considering an example of principal component analysis (PCA) for fault detection and localization, wherein a PCA model is used for fault detection. The faulty variables are identified according to Complete Decomposition Contribution (CDC) method. PCA is a model for dimensionality reduction in multivariate statistical analysis which orthogonally transforms m-dimensional data into k-dimensions by projecting the data on to k principal directions of the data distribution by finding a set of linearly uncorrelated variables. The newly constructed, linearly uncorrelated variables are called principal components (PCs). Let X be the input vector with m variables $x \in R^m$ and each variable has n independent samples then the data matrix of size m×n is:

$$X = [x1, x2 \ldots xn]^T \epsilon R^{n \times m} \quad (1)$$

Each column of X represents a variable, and each row represents a time series data sample. The PCA model first standardizes each sample of X by calculating the covariance matrix (Y) of X as follows:

$$\text{cov}(x) \approx \frac{X^T \cdot X}{n-1} \quad (2)$$

Principal components are obtained by calculating the eigenvectors of covariance matrix. The eigenvector with the highest eigenvalue represents the largest variability of information of data and c principal components that together represent p % (e.g. 90%) variability in the data are selected. Hotelling's $T^2$ statistic is used to evaluate the variation of each sample in the PCA space. For the input vector X, identity matrix I, number of principal components Pc and covariance matrix $\in$, $T^2$ can be calculated as:

$$T^2 = X^T P_c \Sigma {-1} P_c^T X \quad (3)$$

$T^2$ values for all the data samples are calculated and samples with $T^2$ values exceeding the threshold of $T^2$ are detected as faulty samples. $T^2$ statistic follows the $Chi^2$ distribution. To determine the threshold (TH1) of the $T^2$ statistic, the value of $Chi^2$ corresponding to 95% significance is obtained from the distribution. Faulty samples=$X_i$ for which $T_i^2 \geq TH1$, where i is the reference index for the data samples. For samples identified to be faulty, Complete Decomposition Contributions (CDC) method is used for fault localization. CDC determines the fault contribution score, wherein the fault contribution score is a contribution of each variable to the overall $T^2$ statistic, due its variance and covariance. $T^2$ score is decomposed as the summation of the contributions of each variable using Eq. 4:

$$CDC_i iT^2 = (I^T P_c \Sigma P_c^T X_i)^2 \quad (4)$$

In CDC, Contributions for each variable for all the detected faulty samples is calculated. For every data sample, individual contributions of all variables to T2 are calculated and variables for which the contribution exceeds the pre-defined threshold (TH2), i.e. (CDCs≥TH2). Then, variables contributing to more than 5% of faulty data samples are selected as the faulty variables responsible for the fault.

At step 310 of the method (300), the plurality of fault variables is discretized and transformed to obtain a plurality of discretized-transformed fault variables in the discretizer and transformer 210. The plurality of discretized-transformed fault variables is discretized and transformed based on a discretization-transformation technique.

In an embodiment, the discretization technique comprises of one of a equal width discretization, an equal frequency discretization, a k-means discretization, a maximum entropy discretization and a bayesian blocks discretization for time-series data. The transformation techniques comprise one of a windowing, an introduction of lags and a normalization.

The discretization-transformation technique is explained in this section, by considering an example of equal width discretization and windowing of data. Discretization transforms continuous data into categorical data by dividing into finite set of intervals and assigns the specific value within each interval. Equal width discretization that divides the data into equal number of k bins. The width of each bin is calculated as w=(max−min)/k and the bin bounds are min+w, min+2w, . . . , min+(k−1)w. In windowing, so as to use the temporal dependency of time-series data, input data is divided into a plurality of segments along the temporal dimension each having a fixed window length. The appropriate process and residence time lags are incorporated into one or more variables.

At step 312 of the method (300), a causal map of the plurality of discretized-transformed fault variables is generated using a dynamic causal network generation technique in the causal map generator 212. The causal map defines a cause-effect relationship among the plurality of discretized-transformed fault variables, and a causal contribution score and a lag value is computed for each of the plurality of discretized-transformed fault variables in the causal map.

In an embodiment, the dynamic causal map generation technique comprises one of a multivariate time delayed transfer entropy (MTDTE), a dynamic bayesian network, a bivariate time delayed transfer entropy, estimators and a granger causality.

The estimators associated with these techniques comprises of a maximum likelihood estimator, a Bayesian estimator, a Gaussian estimator, a Kraskov estimator, a max-min hill climbing (MMHC) estimator, a max-min parent and children (MMPC) estimator and a structure estimator.

The dynamic causal network generation technique is explained in this section, by considering an example of MTDTE.

It measures the amount of directed transfer of information between asymmetric interactions in variables and detects causality by measuring the reduction of uncertainty while assuming predictability. Given a variable X=[x1, x2, . . . , xn], its information entropy (IE) can be calculated as shown in Eq. 5.

$$H(X) - \sum_{i=1}^{n} p(xi) \log(p(xi)) \quad (5)$$

Given two variables X (x1, x2, . . . , xk) and Y(y1, y2, . . . , yl), calculation of transfer entropy i.e., the effect on the uncertainty of future x if y is known is given as follows:

$$te(X, Y) = H(X) - H(X \mid Y) = \sum_x \sum_y p(x, y) \log \frac{p(x, y)}{p(x)p(y)} \quad (6)$$

$$te(X \mid Y) = \sum_x \sum_y p(x_{i+1} \mid x_i^{(k)}, y_i^{(l)}) \log\left(\frac{p(x_{i+1} \mid x_i^{(k)}, y_i^{(l)})}{p(x_{i+1} \mid x_i^{(k)})}\right) \quad (7)$$

Where, p(x,y) is the joint probability distribution and p(x|y) denotes the joint probability. The parameters k and l referred to the window lengths of X and Y. $x_i$ and $y_i$ represent the value of variables X and Y at time i. Where, $x_i^{(k)}$=[xi, xi−1, . . . ,xi−k+1] and $y_i^{(l)}$=[yi,yi=1, . . . ,yi−l+1].

Transfer entropy TE(X, Y) is given by the difference between the information entropy of $x_{i+j}$ when both $x_i^{(k)}$) and $y_i^{(l)}$ are known and that when only $x_i^{(k)}$ is known. It is to measure the decrease of x's future uncertainty under the condition that y is known. According to Eq. 6, if x and y are independent, then p(x,y) is equal to 0 and hence, transfer entropy TE(X,Y) will also be zero. If there is a strong correlation between x and y, then TE(X,Y) will be a large non-zero number. It is possible to measure causal relationships due to asymmetric form transfer entropy.

In chemical industries, time delay/lags between variable interactions are very common due to residence times and corrective actions of control systems, wherein for a time lag t, the modified transfer entropy or the causal contribution score (TE) is expressed as follows:

$$TE(X \mid Y) = \sum_{x_{i+t}, x_i^{(k)}} \sum_{y_i^{(l)}} p(x_{i+t} \mid x_i^{(k)}, y_i^{(l)}) \log\left(\frac{p(x_{i+t} \mid x_i^{(k)}, y_i^{(l)})}{p(x_{i+t} \mid x_i^{(k)})}\right) \quad (8)$$

Eq.8 represents the multivariate time delayed transfer entropy (MTDTE). The probability density function (PDF) is estimated by a kernel estimator as shown in Eq. 9, which is nonparametric method to fit any shape of distribution.

$$\hat{p}(x) = \frac{1}{nh} \sum_{i=1}^{n} K\left(\frac{x - x_i}{h}\right) \quad (9)$$

Where, n is the number of samples and h is the bandwidth selected to minimize the mean square error of the PDF calculated as h=c.σ.n$^{-1/5}$. Where, c=(4/3)$^{1/5}$~1.06 according to "normal reference rule-of-thumb" approach (Li et al, 2007). For the multivariate case (m dimensional), the estimation of PDF is, $$\hat{p}(x_1, x_2, \ldots, x_m) = \frac{1}{nh_1 \ldots hm} \sum_{i=1}^{n} K\left(\frac{x_1 - x_{i1}}{h_1}\right) \cdot K\left(\frac{x_m - x_{im}}{h_m}\right) \quad (10)$$

Where the notations are same as Eq. 9 except hs= c.σ(x$_{is}$)$_{i=1}^n$.n$^{-1/(4+m)}$ for s=1 . . . m. Transfer entropy represents the information transfer in each direction. Therefore, MTDTE method can be applied for structure learning of complex systems with nonlinear interactions, especially for systems with recycle streams. A causal structure/map is a directed graph that represents cause-effect relations among the variables. Each node in the causal map is a variable while the edge between any two nodes represents the causal relationship and its direction between the two variables. MTDTE quantifies the information transfer or strength of causality along the edges.

At step 314 of the method (300), at least one root cause for the fault is identified based on a Fault Traversal and Root Cause Identification (FTRCI) technique in the root cause identifier 214. The root causes are identified using the causal map, the causal contribution scores, the lag values, and the fault contribution scores based on the FTRCI technique.

The Fault Traversal and Root Cause Identification (FTRCI) algorithm is utilized for automatic identification of fault traversal paths and root cause variables (RCVs) in industrial processes including nonlinear processes without explicit specification of fault types.

The fault traversal path is an ordered set of nodes P=[η$_1$, η$_2$, . . . ,η$_L$] obtained via the FTRCI algorithm starting with the leaf node and adding nodes to the pathway with preference to higher values of $\Gamma$ where $\Gamma$ is the transfer entropy value of the edge.

$$\eta = \mathrm{argmax}\, \eta \in \mathcal{N}\, \Gamma_\eta \quad (11)$$

Figure 4A:
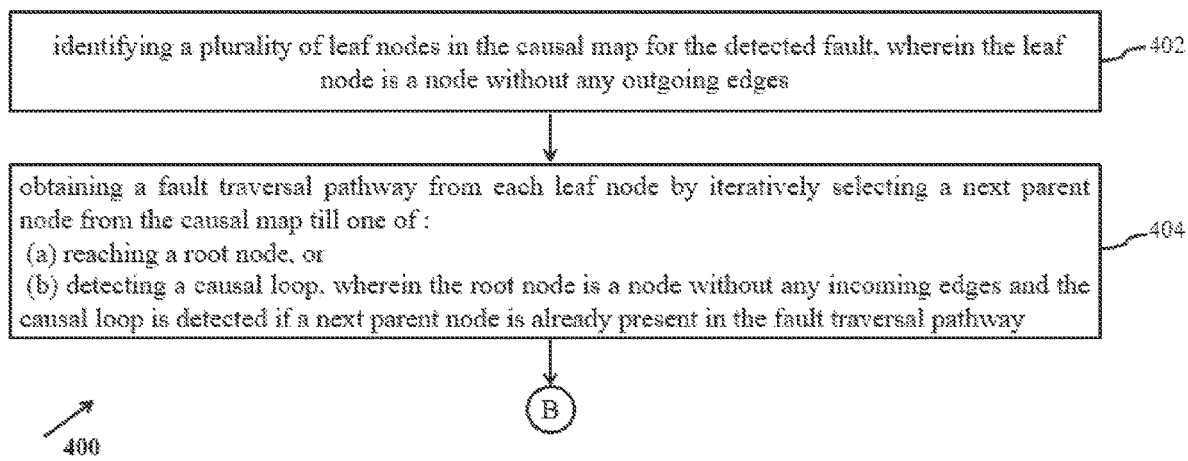

In an embodiment, the FTRCI technique is explained using the FIG. 4 as described below:

At step 402 of the method (400), a plurality of leaf nodes is identified in the causal map for the detected fault. The leaf node is a node without any outgoing edges. However, in case of absence of leaf nodes in the causal map, then each non-root node will be considered as leaf node. The root node is a node without any incoming edges.

In an embodiment, the fault traversal paths start from each of the leaf nodes ($\mathcal{L} \in \mathcal{N}$) . . . $\mathcal{N}$ is set of all nodes of causal map. $\mathcal{L}$ is ordered based on CDC scores. From the identified leaf nodes, the leaf node with highest CDC is selected as the starting node in the fault traversal path (η$_1$) as shown in Eq 12.

$$\eta_1 = \mathrm{argmax}\, \eta \in \mathcal{L}\, CDC \quad (12)$$

At step 404 of the method (400), a fault traversal pathway is obtained. The fault traversal pathway is obtained from each leaf node by iteratively selecting a next parent node from the causal map till one of:
(a) reaching a root node, or
(b) detecting a causal loop, wherein the causal loop is detected if a next parent node is already present in the fault traversal pathway.

In an embodiment, fault traversal pathway is obtained from each leaf node by iteratively selecting a next parent node from the causal map. The node η$_i$ (excluding the first node) in the pathway is inferred from the parent nodes of η$_{i-1}$, thus traversing the reversed edge in the causal map. Parent node with highest transfer entropy is selected and added in the fault traversal path (Eq. 13).

$$\eta_i = \mathrm{argmax}\, \eta \in Pr(\eta_{i-1})\, \Gamma_\eta$$

The process of iteratively selecting a next parent node from the causal map continues till (a) reaching a root node, or (b) detecting a causal loop.

At step 406 of the method (400), a root cause variable is identified in the fault traversal pathway. The root cause variable indicates the root cause of the fault. The step of identification of the root cause variable in the fault traversal pathway comprises:
(a) for the fault traversal pathway terminated on reaching a root node: the root node is identified as the root cause variable, or
(b) for the fault traversal pathway in which a causal loop is detected: the root cause variable is identified based on the lag value of the plurality of discretized-transformed fault variables in the causal loop of the causal map.

In an embodiment, η$_i$ denotes the i$^{th}$ node in the fault traversal path and Pr(η$_{i-1}$) denotes the set of parent nodes of node η$_{i-1}$. Node η$_i$ is added to the path (P=P $\cup$ η$_i$). The search for fault traversal path continues until η$_j$ is root node i.e. it does not have any parent nodes η$_j \in \mathcal{R}$ or node η$_j$ is already present in the path η$_j \in$ P. Where, $\mathcal{R}$ is set of root nodes of causal map. If the selected node η$_j$ is a root node, then η$_j$ is determined as RCV leading to faulty operation. Otherwise, if η$_j$ is already present in P, then a cycle or loop is detected. For cyclic paths, the variable having the highest lag value in the cycle is declared as the RCV (Eq. 14).

$$rcv(P) = \begin{cases} \eta_i, & \text{if } \eta_i \in \mathcal{R} \\ \mathrm{argmax}_{e_{ij}} k, & \text{if } \eta_i \in P \end{cases} \quad (14)$$

Where, k represents the lag weight for parent node j in edge $e_{ij}$:{η$_i \leftarrow$ η$_j$} in path P. For cyclic causal maps, the disclosed FTRCI investigates the leading and lagging variables and thus identifies the correct root cause(s) of the fault.

Hence, a root cause is identified for each leaf node in the causal map. Each root cause and fault traversal pathway identified for all the leaf nodes are displayed to the user on the I/O interface(s) 106.

EXPERIMENTS

An experiment has been conducted based on the disclosed techniques for root cause identification of faults in manufacturing and process industries. The experiment has been conducted using the Tennessee Eastman process (TEP) which is an industrial benchmark process that is widely used for time series data analysis, monitoring of statistical processes and process fault detection and diagnosis. The plant consist of 5 major process units which are an exothermic 2-phase reactor, a product stripper, condenser, a vapor-liquid separator and a recycle compressor. The variables represents the pressure, temperature, and flowrates of the units in the TEP.

Figure 5:
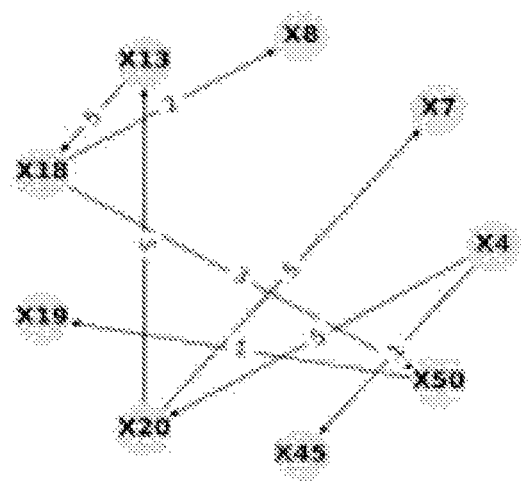
FIG. 5 is a graph illustrating results as a causal map in accordance with some embodiments of the present disclosure.

The causal maps for a detected fault are generated as shown in FIG. 5. FIG. 5 illustrates the causal map (CM) obtained using Kraskov estimator. Fault traversal is done by first identifying the leaf nodes, which are clearly X8, X7, X19 and X45. The path is traversed as per FTRCI and the resulting fault traversal paths are shown in Table 1. All four paths are acyclic and terminating at root node X4, which is the root cause of the fault.

TABLE 1

Fault traversal paths

| Estimator | Path No. | Fault traversal paths | Type | RCV |
|---|---|---|---|---|
| Kraskov | 1 | X4 → X20 → X13 → X18 → X50 → X19 | Acyclic | X4 |
| | 2 | X4 → X20 → X13 → X18 → X8 | Acyclic | X4 |
| | 3 | X4 → X20 → X7 | Acyclic | X4 |
| | 4 | X4 → X45 | Acyclic | X4 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provide a solution to address a problem of for root cause identification of faults in manufacturing and process industries. With interrelated multivariate data in manufacturing and process industries, the process of root cause identification (RCI) of faults is challenging. Further, the existing techniques for RCI have a great dependency on manual inputs and subject matter knowledge/experts. The disclosure is a method and a system for root cause identification of faults based on causal maps. The root cause of fault is identified in several steps including: generation of casual maps using inputs received from a manufacturing and process industry and root cause identification from the causal maps based on a Fault Traversal and Root Cause Identification (FTRCI) technique. The FTRCI identifies root cause from the causal map by identifying a fault traversal pathway from leaf nodes in the causal map, wherein the fault traversal pathway is identified for even cyclic nodes.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for root cause identification of faults in manufacturing and process industries comprising:
receiving a plurality of time series data from a plurality of sources, via one or more hardware processors, wherein the plurality of time-series data comprises a plurality of real-time data and a plurality of non-real-time data, and wherein the plurality of sources associated with the manufacturing and process industries comprises a sensor database, a laboratory database, an environment database and a maintenance database;
pre-processing the plurality of time-series data to obtain a plurality of pre-processed data, via the one or more hardware processors, wherein the plurality of time-series data is pre-processed using a set of plurality of pre-processing techniques;
predicting a plurality of soft sensed parameters using the plurality of pre-processed data, via the one or more hardware processors, wherein the plurality of soft sensed parameters are predicted based a soft sensed parameters prediction technique;
detecting at a fault, a plurality of fault variables indicative of the fault and a fault contribution score for each of the plurality of fault variables, via the one or more hardware processors, from the plurality of pre-processed data and the plurality of soft sensed parameters using a fault detection-localization technique;
discretizing and transforming the plurality of fault variables to obtain a plurality of discretized-transformed fault variables, via the one or more hardware processors, based on a discretization-transformation technique;
generating a causal map of the plurality of discretized-transformed fault variables using a dynamic causal network generation technique, via the one or more hardware processors, where the causal map defines a cause-effect relationship among the plurality of discretized-transformed fault variables, and a causal contribution score and a lag value is computed for each of the plurality of discretized-transformed fault variables in the causal map; and
identifying at least one root cause for the fault based on a Fault Traversal and Root Cause Identification (FTRCI) technique, via the one or more hardware processors, wherein the root causes are identified using the causal map, the causal contribution scores, the lag values, and the fault contribution scores based on the FTRCI technique.

2. The method of claim 1, wherein the plurality of pre-processing techniques comprises one or more techniques for (a) identification and removal of spurious values, (b) imputation of missing values and unification of sampling frequency and (c) a synchronization of data and combining data from plurality of data sources.

3. The method of claim 1, wherein the soft sensed parameters prediction technique comprises one of a physics-based models, a physics-based expressions and a data-driven models.

4. The method of claim 1, wherein the fault detection-localization technique comprises one of a statistical and machine learning techniques including a Principal component analysis (PCA), a Mahalanobis distance, a local outlier factor, an isolation forest, an elliptic envelope, a one-class support vector machine, a K-nearest neighbors, and a deep learning techniques that comprises a multilayer perceptron, an auto-Encoders (AEs) including a long short term memory autoencoder (LSTM-AE) cells, a dense autoencoder (Dense-AE), and a convolution neural network autoencoder (CNN-AE).

5. The method of claim 1, wherein the discretization-transformation technique comprises of one of an equal width discretization, an equal frequency discretization, a maximum entropy discretization and a bayesian blocks discretization for time series data.

6. The method of claim 1, wherein the dynamic causal map generation techniques comprise one of a multivariate time delayed transfer entropy (MTDTE), a dynamic bayesian network technique, a bivariate time delayed transfer entropy technique, and a granger causality technique.

7. The method of claim 1, wherein the FTRCI technique for identification of at least one root cause for the fault comprises:
identifying a plurality of leaf nodes in the causal map for the detected fault, wherein the leaf node is a node without any outgoing edges;
obtaining a fault traversal pathway from each leaf node by iteratively selecting a next parent node from the causal map till one of:
(a) reaching a root node, or
(b) detecting a causal loop, wherein the root node is a node without any incoming edges and the causal loop is detected if a next parent node is already present in the fault traversal pathway; and
identifying a root cause variable in the fault traversal pathway, wherein the root cause variable indicates the root cause, the identification of the root cause variable comprises:
(a) for the fault traversal pathway obtained on reaching a root node: the root node is identified as the root cause variable, or
(b) for the fault traversal pathway obtained on detecting a causal loop: the root cause variable is identified based on the lag value of the plurality of discretized-transformed fault variables in the causal loop of the causal map.

8. A system, comprising:
a memory storing instructions;
one or more communication interfaces; and
one or more hardware processors coupled to the memory via the one or more communication interfaces, wherein the one or more hardware processors are configured by the instructions to:
receive a plurality of time series data from a plurality of sources, via one or more hardware processors, wherein the plurality of time-series data comprises a plurality of real-time data and a plurality of non-real-time data, and wherein the plurality of sources associated with the manufacturing and process industries comprises a sensor database, a laboratory database, an environment database and a maintenance database;
pre-process the plurality of time-series data to obtain a plurality of pre-processed data, via the one or more hardware processors, wherein the plurality of time-series data is pre-processed using a set of plurality of pre-processing techniques;
predict a plurality of soft sensed parameters using the plurality of pre-processed data, via the one or more hardware processors, wherein the plurality of soft sensed parameters are predicted based a soft sensed parameters prediction technique;
detect a fault, a plurality of fault variables indicative of the fault and a fault contribution score for each of the plurality of fault variables, via the one or more hardware processors, from the plurality of pre-processed data and the plurality of soft sensed parameters using a fault detection-localization technique;

discretize and transform the plurality of fault variables to obtain a plurality of discretized-transformed fault variables, via the one or more hardware processors, based on a discretization-transformation technique;

generate a causal map of the plurality of discretized-transformed fault variables using a dynamic causal network generation technique, via the one or more hardware processors, where the causal map defines a cause-effect relationship among the plurality of discretized-transformed fault variables, and a causal contribution score and a lag value is computed for each of the plurality of discretized-transformed fault variables in the causal map; and identify at least one root cause for the fault based on a Fault Traversal and Root Cause Identification (FTRCI) technique, via the one or more hardware processors, wherein the root causes are identified using the causal map, the causal contribution scores, the lag values, and the fault contribution scores based on the FTRCI technique.

9. The system of claim 8, wherein the one or more hardware processors are configured by the instructions for performing the pre-processing techniques comprises one or more techniques for (a) identification and removal of spurious values, (b) imputation of missing values and unification of sampling frequency and (c) a synchronization of data and combining data from plurality of data sources.

10. The system of claim 8, wherein the one or more hardware processors are configured by the instructions for performing the soft sensed parameters prediction technique comprises one of a physics-based models, a physics-based expressions and a data-driven models.

11. The system of claim 8, wherein the one or more hardware processors are configured by the instructions for performing the fault detection-localization technique comprises one of a statistical and machine learning techniques including a Principal component analysis (PCA), a Mahalanobis distance, a local outlier factor, an isolation forest, an elliptic envelope, a one-class support vector machine, a K-nearest neighbors, and a deep learning techniques that comprises a multilayer perceptron, an auto-Encoders (AEs) including a long short term memory autoencoder (LSTM-AE) cells, a dense autoencoder (Dense-AE), and a convolution neural network autoencoder (CNN-AE).

12. The system of claim 8, wherein the one or more hardware processors are configured by the instructions for performing the discretization-transformation technique comprises of one of a equal width discretization, an equal frequency discretization, a maximum entropy discretization and a bayesian blocks discretization for time series data and the dynamic causal map generation techniques comprise one of a multivariate time delayed transfer entropy (MTDTE), a dynamic bayesian network technique, a bivariate time delayed transfer entropy technique, and a granger causality technique.

13. The system of claim 8, wherein the one or more hardware processors are configured by the instructions for performing the FTRCI technique for identification of at least one root cause for the fault comprising:

identifying a plurality of leaf nodes in the causal map for the detected fault, wherein the leaf node is a node without any outgoing edges;

obtaining a fault traversal pathway from each leaf node by iteratively selecting a next parent node from the causal map till one of:
(a) reaching a root node, or
(b) detecting a causal loop, wherein the root node is a node without any incoming edges and the causal loop is detected if a next parent node is already present in the fault traversal pathway; and identifying a root cause variable in the fault traversal pathway, wherein the root cause variable indicates the root cause, the identification of the root cause variable comprises:
(a) for the fault traversal pathway obtained on reaching a root node: the root node is identified as the root cause variable, or
(b) for the fault traversal pathway obtained on detecting a causal loop: the root cause variable is identified based on the lag value of the plurality of discretized-transformed fault variables in the causal loop of the causal map.

14. A computer program product comprising a non-transitory computer readable medium having a computer readable program embodied therein, wherein the computer readable program, when executed on a computing device, causes the computing device to:

receive a plurality of time series data from a plurality of sources, via one or more hardware processors, wherein the plurality of time-series data comprises a plurality of real-time data and a plurality of non-real-time data, and wherein the plurality of sources associated with the manufacturing and process industries comprises a sensor database, a laboratory database, an environment database and a maintenance database;

pre-process the plurality of time-series data to obtain a plurality of pre-processed data, via the one or more hardware processors, wherein the plurality of time-series data is pre-processed using a set of plurality of pre-processing techniques;

predict a plurality of soft sensed parameters using the plurality of pre-processed data, via the one or more hardware processors, wherein the plurality of soft sensed parameters are predicted based a soft sensed parameters prediction technique;

detect at a fault, a plurality of fault variables indicative of the fault and a fault contribution score for each of the plurality of fault variables, via the one or more hardware processors, from the plurality of pre-processed data and the plurality of soft sensed parameters using a fault detection-localization technique;

discretize and transforming the plurality of fault variables to obtain a plurality of discretized-transformed fault variables, via the one or more hardware processors, based on a discretization-transformation technique;

generate a causal map of the plurality of discretized-transformed fault variables using a dynamic causal network generation technique, via the one or more hardware processors, where the causal map defines a cause-effect relationship among the plurality of discretized-transformed fault variables, and a causal contribution score and a lag value is computed for each of the plurality of discretized-transformed fault variables in the causal map; and identify at least one root cause for the fault based on a Fault Traversal and Root Cause Identification (FTRCI) technique, via the one or more hardware processors, wherein the root causes are identified using the causal map, the causal contribution scores, the lag values, and the fault contribution scores based on the FTRCI technique.

* * * * *